United States Patent
Nagpal et al.

(10) Patent No.: US 8,229,901 B2
(45) Date of Patent: Jul. 24, 2012

(54) DISK SCRUBBING

(75) Inventors: Abhinay R. Nagpal, Pune (IN);
Sandeep R. Patil, Elmsford, NY (US);
Dhaval K. Shah, Pune (IN); Yan W. Stein, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 12/876,130

(22) Filed: Sep. 4, 2010

(65) Prior Publication Data
US 2012/0059803 A1    Mar. 8, 2012

(51) Int. Cl.
G06F 7/00    (2006.01)
G06F 17/00    (2006.01)
(52) U.S. Cl. .................. 707/692; 707/693; 707/758
(58) Field of Classification Search .................. 707/692, 707/693, 758
See application file for complete search history.

(56) References Cited

U.S. PATENT DOCUMENTS

| | | | |
|---|---|---|---|
| 5,913,927 A * | 6/1999 | Nagaraj et al. ............... | 714/6.13 |
| 7,017,107 B2 | 3/2006 | Talagala et al. | |
| 7,137,038 B2 | 11/2006 | New et al. | |
| 7,191,438 B2 * | 3/2007 | Bryant ........................ | 717/176 |
| 7,346,806 B2 | 3/2008 | Forrer, Jr. et al. | |
| 7,434,012 B1 | 10/2008 | Ives et al. | |
| 7,650,557 B2 * | 1/2010 | Totolos, Jr. ................... | 714/763 |
| 7,653,838 B2 | 1/2010 | Forrer, Jr. et al. | |
| 8,078,814 B2 * | 12/2011 | Emaru et al. .................. | 711/162 |
| 2007/0079185 A1 * | 4/2007 | Totolos, Jr. ................... | 714/718 |
| 2009/0300152 A1 | 12/2009 | Ferris | |
| 2010/0017472 A1 * | 1/2010 | Benedyk et al. ............... | 709/204 |
| 2010/0174688 A1 * | 7/2010 | Anumakonda et al. ........ | 707/692 |
| 2010/0274772 A1 * | 10/2010 | Samuels ....................... | 707/693 |
| 2011/0307457 A1 * | 12/2011 | Ishii et al. ..................... | 707/692 |

OTHER PUBLICATIONS

Cloudy Skies Ahead: Threats, Opportunities, Hope & Hype, Arma Partners, http://www.armapartners.com/files/admin/uploads/W17_F_1873_38607.pdf?q=dell-laptop-giveaway-facebook, Date: Jan. 2009.

* cited by examiner

*Primary Examiner* — Phong Nguyen
(74) *Attorney, Agent, or Firm* — Adam M. Steadman; Thomas E. Tyson (57) ABSTRACT

A method, a system, and a computer program product are provided for data management. The method may comprise identifying a predefined set of data storage parameters and a predefined set of data scrubbing parameters. The method further may comprise determining the predefined set of data scrubbing parameters for first data in a first data storage based on the predefined set of data storage parameters for the first data and performing data scrubbing for the first data using the determined predefined set of data scrubbing parameters. Furthermore, the method may comprise comparing first data in the first data storage and corresponding second data in a second data storage. If a mismatch is determined between the first data and the second data, the method further may comprise synchronizing the first data with the second data as a result of the comparison.

12 Claims, 6 Drawing Sheets

DISK SCRUBBING

BACKGROUND

Data integrity is an important issue for many data storage systems and subsystems. Data warehouse applications tend to be very I/O (input/output) intensive, as the database may read trillions of bytes of information. Data warehouse systems typically require specialized servers that can support the typical processing that is observed in data warehouses. Most data warehouses are bi-modal and have batch windows (usually in the evenings) when new data is loaded, indexed, and summarized. The server is desired to have dynamic CPU and RAM resources, and the database management system must be able to dynamically reconfigure its resources to accommodate these shifts in processing. I/O performance is a common concern for data warehouses. The potential bottleneck also depends on user workload and application access patterns. When a system is constrained by I/O capabilities, it is I/O bound, or has an I/O bottleneck.

Disk scrubbing technology (DST) is designed to protect against bad disk sectors in data storage. Bad sectors can form on hard disk drive areas that are not accessed for long periods of time. DST offers a proactive approach to address data integrity. In the context of a system comprising a redundant array of independent disks (RAID) configuration, DST offers a proactive approach to address data integrity and helps maintain the system by scanning for bad sectors or parity errors in RAID sets. Specifically, the system may use DST to reconstruct bad sectors from other sectors, and at the same time the system may use DST to detect parity inconsistency.

SUMMARY

The various embodiments described herein are directed to a method, a system, and a computer program product for data management. By using predefined sets of parameters, the various embodiments provide for data integrity via data scrubbing.

In accordance with a first aspect of the various embodiments, a method for data management is provided. The method may be implemented via a computing device. The method may comprise identifying a predefined set of data storage parameters and identifying a predefined set of data scrubbing parameters. The method further may comprise determining the predefined set of data scrubbing parameters for first data in a first data storage based on the predefined set of data storage parameters for the first data and performing data scrubbing for the first data using the determined predefined set of data scrubbing parameters.

In accordance with an embodiment, the predefined set of data storage parameters may include data storage type, data storage topology, and data storage configuration. Moreover, the predefined set of data scrubbing parameters may include data scrubbing frequency, and data scrubbing block size. In accordance with an embodiment, the data storage type may include a solid state disk (SSD), a hard disk (HD), an optics-based storage, and a photonics-based storage. Furthermore, the data storage configuration may include a redundant array of independent disks (RAID) configuration. Additionally, the data storage topology may be a cloud.

The method in accordance with the first aspect of the various embodiments further may comprise comparing first data in the first data storage and corresponding second data in a second data storage. If a mismatch is determined between the first data and the second data, the method further may comprise synchronizing the first data with the second data as a result of the comparison.

In accordance with a second aspect of the various embodiments, a data management system is provided that comprises at least one processor and at least one memory. The processor may be configured to execute one or more of the steps described above with respect to the first aspect of the various embodiments.

In accordance with a third aspect of the various embodiments, a computer program product for data management is provided. The computer program product may comprise computer readable program code instructions stored therein. The instructions may comprise one or more sets of instructions for executing one or more of the steps described above with respect to the first aspect of the various embodiments.

In accordance with a fourth aspect of the various embodiments, a method for data management is provided. The method may be implemented via a computing device. The method may comprise identifying a predefined set of service level agreement (SLA) parameters, wherein the predefined set of SLA parameters comprises data availability, and wherein data availability for crucial data or data associated with a premium user is higher than data availability for non-crucial data or data associated with a non-premium user. Moreover, the method may comprise identifying a predefined set of data scrubbing parameters, wherein the predefined set of data scrubbing parameters comprises data scrubbing frequency. Furthermore, the method may comprise determining the predefined set of data scrubbing parameters for first data in a first data storage based on the predefined set of SLA parameters for the first data, wherein data scrubbing frequency determined for the first data may be higher than data scrubbing frequency determined for other data if data availability for the first data is higher than data availability for the other data. Additionally, the method may comprise performing data scrubbing for the first data in accordance with the determined predefined set of data scrubbing parameters.

In accordance with an embodiment, the predefined set of SLA parameters further may comprise at least one of data latency and allocation of central processing unit (CPU) usage. Moreover, the predefined set of data scrubbing parameters further may comprise data scrubbing block size, wherein data scrubbing block size determined for the first data may be smaller than data scrubbing block size determined for other data if data availability for the first data is higher than data availability for the other data.

The method in accordance with the fourth aspect of the various embodiments further may comprise comparing the first data in the first data storage and corresponding second data in a second data storage. Moreover, the method further may comprise synchronizing the first data with the second data if a mismatch is determined between the first data and the second data as a result of the comparison.

In accordance with a fifth aspect of the various embodiments, a data management system is provided that comprises at least one processor and at least one memory. The processor may be configured to execute one or more of the steps described above with respect to the fourth aspect of the various embodiments.

In accordance with a sixth aspect of the various embodiments, a computer program product for data management is provided. The computer program product may comprise computer readable program code instructions stored therein. The instructions may comprise one or more sets of instructions for executing one or more of the steps described above with respect to the fourth aspect of the various embodiments.

BRIEF DESCRIPTION OF THE DRAWINGS

Exemplary embodiments are described below, by way of example only, with reference to the following schematic drawings, where.

DETAILED DESCRIPTION

Certain aspects, advantages, and novel features of the various embodiments are described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

The various embodiments described herein are directed to a method, a system, and a computer program product for data management. The various embodiments provide for data integrity, amongst other aspects. The various embodiments are directed to determining a predefined set of data scrubbing parameters based on a predefined set of data storage parameters. Data storage types in accordance with the various embodiments include a solid state disk (SSD), a hard disk (HD), an optics-based storage, and a photonics-based storage. Data storage configurations in accordance with the various embodiments include a redundant array of independent disks (RAID) configuration. Data storage topologies in accordance with the various embodiments include a cloud.

Figure 1:
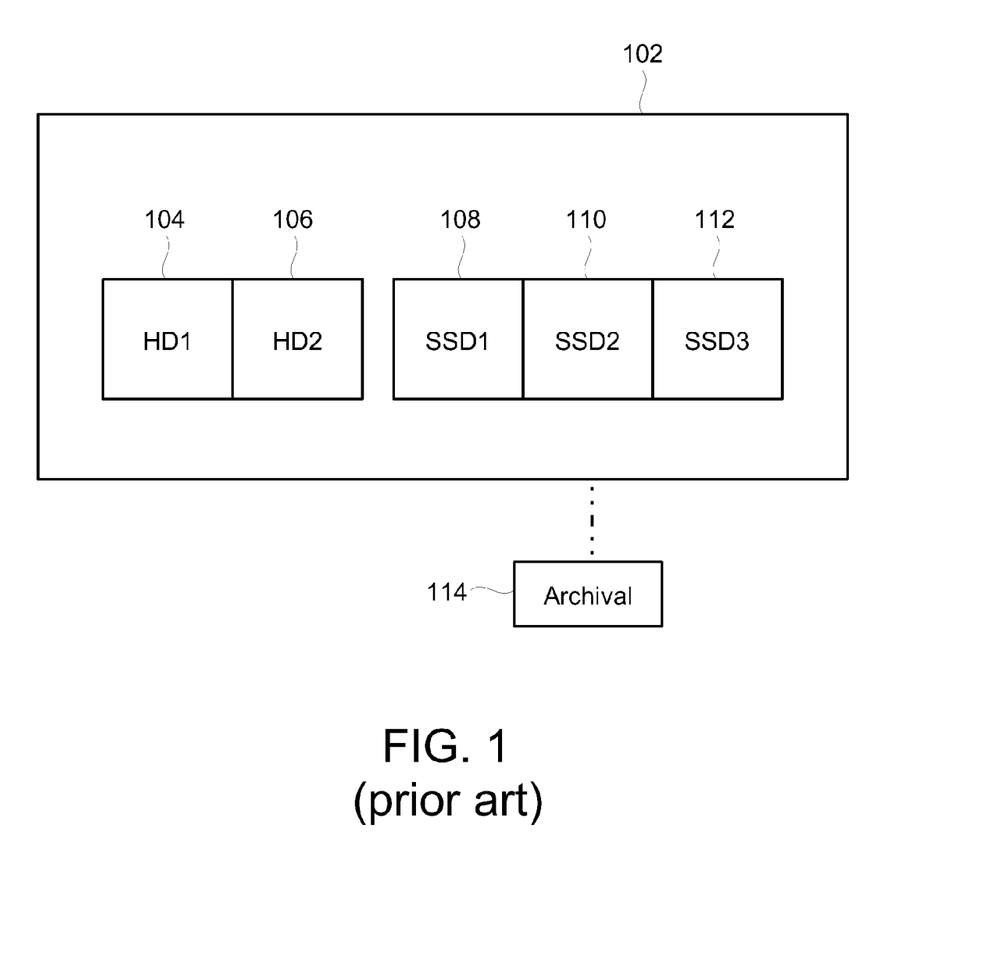
FIG. 1 depicts a conventional schematic of a data storage having multiple data storage types.

FIG. 1 depicts a conventional schematic 100 of a data storage 102 having multiple data storage types. The data storage 102 includes two types of data storage as found in prior art. The first type may be a hard disk (HD), and the other type may be a solid state disk (SSD). HD1 104 and HD2 106 depict two HD type disks. SSD1 108, SSD2 110, and SSD3 112 depict three SSD type disks. Data storage 102 may be communicatively coupled to archival drive 114, where the original data may reside. Archival drive 114 may be a tape drive. A SSD is a data storage device that conventionally uses solid-state memory to store persistent data. A SSD emulates a hard disk drive interface and thus may replace it in most applications. The original usage of the term "solid-state" (from solid-state physics) refers to the use of semiconductor devices rather than electron tubes, but the term has been adopted to distinguish solid-state electronics from electromechanical devices. With no moving parts, SSDs are less fragile than HDs and also are silent (unless a cooling fan is used). Since there are no mechanical delays, SSDs usually involve low access time and low latency.

FIGS. 2A, 2B, 2C, and 2D depict conventional schematics of a widely used data storage configuration. FIGS. 2A through 2D illustrate various redundant array of independent disks (RAID) configurations. RAID is a technology that allows high levels of storage reliability from low-cost and less reliable PC-class disk-drive components by arranging the devices into arrays for redundancy. RAID combines two or more physical hard disks into a single logical unit using special hardware or software. Hardware solutions are often designed to present themselves to the attached system as a single hard drive, so that the operating system is unaware of the technical workings. There are three key concepts in RAID: mirroring, the writing of identical data to more than one disk; striping, the splitting of data across more than one disk; and error correction, where redundant parity data is stored to allow problems to be detected and possibly repaired (known as fault tolerance). Different RAID configurations use one or more of these techniques, depending on the system requirements. The purpose of RAID is to improve reliability and availability of data, ensuring that important data is not harmed in case of hardware failure, and/or to increase the speed of file input/output.

Each RAID configuration affects reliability and performance in different ways. Every additional disk included in an array increases the likelihood that one will fail, but by using error checking and/or mirroring, the array as a whole can be made more reliable by the ability to survive and recover from a failure. Basic mirroring can speed up the reading of data, as a system can read different data from multiple disks at the same time, but it may be slow for writing if the configuration requires that all disks must confirm that the data is correctly written. Striping, often used for increasing performance, writes each bit to a different disk, allowing the data to be reconstructed from multiple disks faster than a single disk could send the same data. Error checking typically will slow performance, as data needs to be read from multiple places and then compared. The design of any RAID scheme is often a compromise in one or more respects, and understanding the requirements of a system is important. Modern disk arrays typically provide the facility to select an appropriate RAID configuration.

Figure 2A:
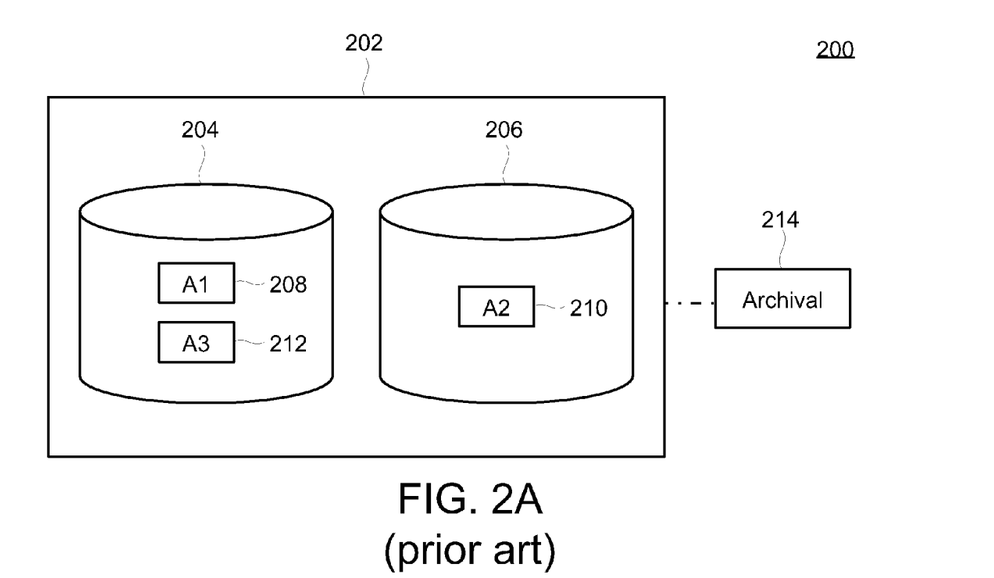
FIGS. 2A, 2B, 2C, and 2D depict conventional schematics of various data storage configurations.

FIG. 2A depicts a conventional RAID0 schematic 200. Schematic 200 includes a data storage 202, which may be communicatively coupled to an archival drive 214. Data storage 202 further includes two disks, disk0 204 and disk1 206. Data element A from archival drive 214 may have three parts A1, A2, and A3. Parts A1, A2, and A3 of the RAID0 schematic 200 provide for splitting of data, also known as striping. These three parts are stored on two disks. A1 208 and A3 212 are stored on disk0 204, and A2 210 is stored on disk1 206.

Figure 2B:
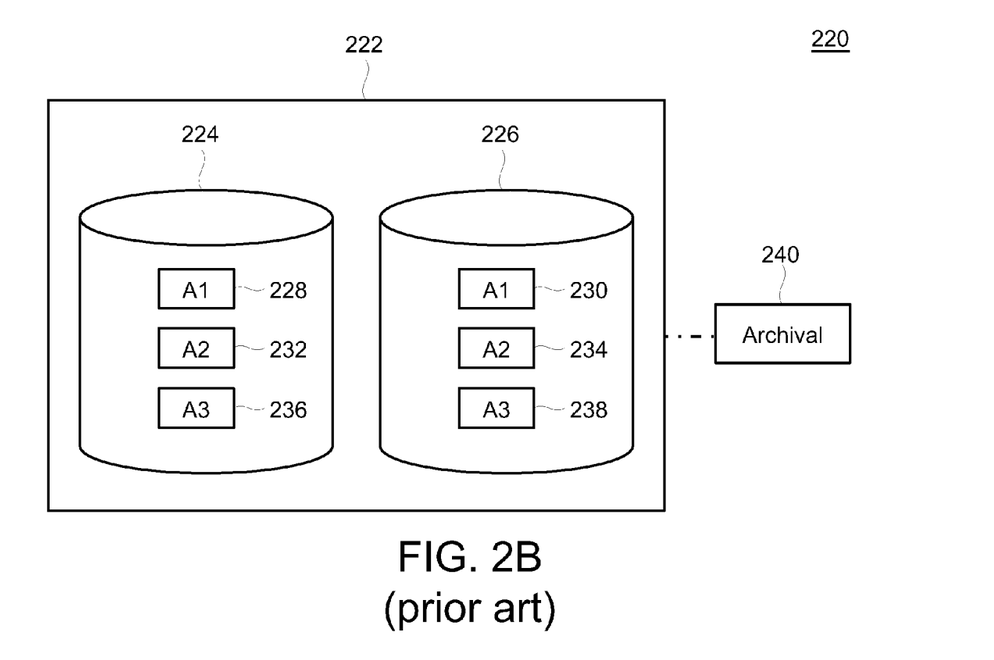

FIG. 2B depicts a conventional RAID1 schematic 220. Schematic 220 includes a data storage 222, which may be communicatively coupled to an archival drive 240. Data storage 222 further includes two disks, disk0 224 and disk1 226. Data element A from archival drive 240 may have three parts A1, A2, and A3. Parts A1, A2, and A3 of the RAID1 schematic 220 provide for mirroring. In data storage, disk mirroring is the replication of logical disk volumes onto separate physical hard disks in real time to ensure continuous availability. A mirrored volume is a complete logical representation of separate volume copies. The three parts A1, A2, and A3 are stored on two disks. A1 is stored on disk0 224 as A1 228 and on disk1 226 as A1 230. A2 is stored on disk0 224 as A2 232 and on disk1 226 as A2 234. A3 is stored on disk0 224 as A3 236 and on disk1 226 as A3 238.

Figure 2C:
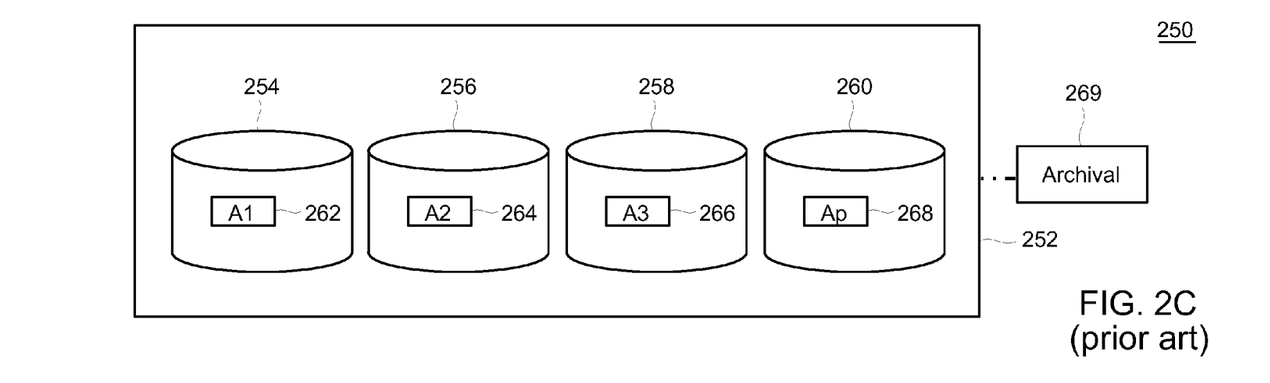

FIG. 2C depicts a conventional RAID5 schematic 250. Schematic 250 includes a data storage 252 showing four disks, disk0 254, disk1 256, disk2 258, and disk3 260. Data storage 252 may be communicatively coupled to an archival drive 269. Data element A from archival drive 269 may have three parts A1, A2, and A3. Parts A1, A2, and A3 of the RAID5 schematic 250 provide for striping. A1 262 is stored on disk0 254, A2 264 is stored on disk1 256, and A3 266 is stored on disk2 258. A parity block is used by certain RAID configurations, including RAID5. Redundancy is achieved by the use of parity blocks. If a single drive in the array fails, data blocks and a parity block from the functioning drives can be combined to reconstruct the missing data. Disk3 260 includes a parity block Ap 268 for data element A.

In the schematic 250, the parity block Ap 368 may be used to reconstruct missing data. For example, if A1 262=00000111, A2 264=00000101, and A3 266=00000000, then Ap 268, a parity block generated by XORing A1 262, A2 264, and A3 266, will equal 00000010. If Disk1 256 fails, A2 264 will no longer be accessible, but A2 264 nevertheless can be reconstructed by XORing A1 262, A3 266, and Ap 268 as follows:

$$A2 = A1 \text{ XOR } A3 \text{ XOR } Ap = 00000101$$

Figure 2D:
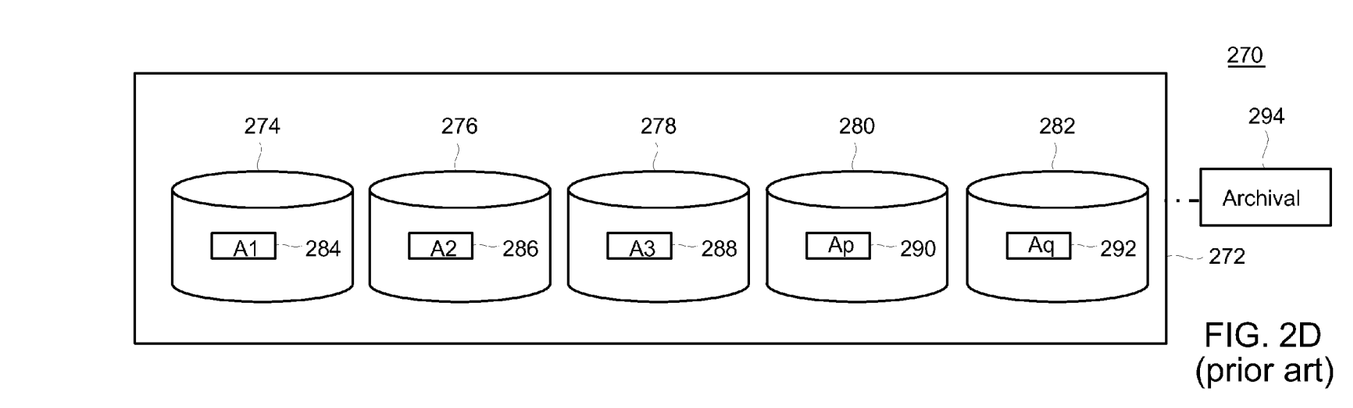

FIG. 2D depicts a conventional RAID6 schematic 270. Schematic 270 includes a data storage 272 showing five disks, disk0 274, disk1 276, disk2 278, disk3 280, and disk4 282. Data storage 272 may be communicatively coupled to an archival drive 294. Data element A from archival drive 294 may have three parts A1, A2 and A3. Parts A1, A2, and A3 of the RAID6 schematic 270 provide for striping. A1 284 is stored on disk0 274, A2 286 is stored on disk1 276, and A3 288 is stored on disk2 278. Disk3 280 and disk4 282 both include parity blocks. Disk3 280 includes a parity block Ap 290, and disk4 282 includes a parity block Aq 292, both for data element A.

Figure 3:
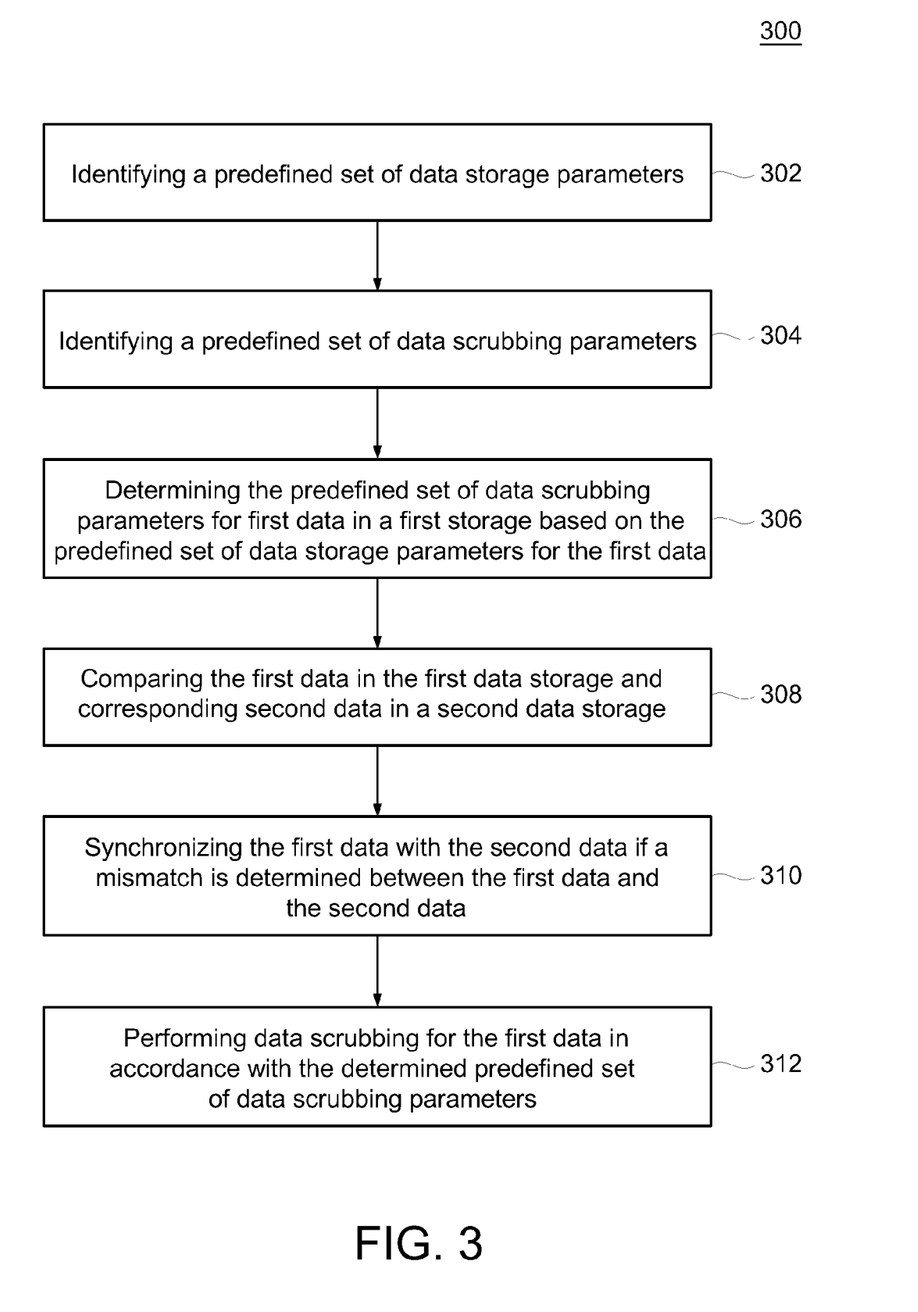
FIG. 3 shows a flow chart for data management, in accordance with an exemplary embodiment.

FIG. 3 shows a flow chart illustrating process steps of a method 300 for data management in accordance with an exemplary embodiment. The method 300 may be implemented via a computing device. Step 302 provides for identifying a predefined set of data storage parameters. The predefined set of data storage parameters may include at least one of data storage type, data storage topology, and data storage configuration. The data storage type may include at least one of a solid state disk (SSD), a hard disk (HD), an optics-based storage, and a photonics-based storage. The data storage configuration may include a redundant array of independent disks (RAID) configuration. The data storage topology may include a cloud.

Step 304 provides for identifying a predefined set of data scrubbing parameters. The predefined set of data scrubbing parameters may include at least one of data scrubbing frequency and data scrubbing block size. With respect to data scrubbing frequency, the data scrubbing agent that verifies data integrity may increase the frequency of data scrubbing in order to improve scrubbing quality. With respect to data scrubbing block size, the data scrubbing agent may either choose to scrub each block (i.e., at a fine granular level) or may choose to scrub multiple blocks at a time (i.e., with less granularity, resulting in an increased chance of non-detection of errors).

Step 306 provides for determining the predefined set of data scrubbing parameters for first data in a first data storage based on the predefined set of data storage parameters for the first data. Step 308 provides for comparing the first data in the first data storage and corresponding second data in a second data storage. If a mismatch is determined between the first data and the second data as a result of the comparison at step 308, step 310 provides for synchronizing the first data with the second data. Step 312 provides for performing data scrubbing for the first data in accordance with the determined predefined set of data scrubbing parameters.

In an exemplary mode, if data storage 102 of FIG. 1 is considered, in conventional mode there are a total five independent storage units: the two HDs HD1 and HD2 and the three SSDs SSD1, SSD2, and SSD3. In conventional practice, if ten scrub cycles are deemed necessary, then the ten scrub cycles will be performed for all the five units, and thus 50 data scrub cycles will be performed.

In accordance with an exemplary embodiment, a distinction may be made between the HDs and the SSDs. Thus, based on the data storage type, which is a parameter among the predefined set of data storage parameters, it may be determined that since there are two HDs, due to moving parts present in HDs, the likelihood of HD failure is greater than the likelihood of SSD failure. Hence, it may be determined that relatively more data scrub cycles should be allocated to HDs than for the SSDs. In an exemplary mode, each of the two HDs may get 10 data scrub cycles for a total of 20 HD data scrub cycles, while each SSD may get only six cycles for the same efficiency of data integrity for a total of 18 SSD data scrub cycles. The sum total of all data scrub cycles in such case is 38 (10*2+6*3=38). Thus, by using three SSDs instead of three additional HDs, 12 data scrub cycles have been avoided, and yet no compromise on data integrity has been made. Thus, using three SSDs instead of three additional HDs in such case may result in at least one of more optimal resource usage, less heat generation, more environmentally friendly operation, less metadata management, and less cost. If the probability of failure of HD is, heuristically or otherwise, determined to be 1.5 times more than SSD due to SSD having no moving parts, then scrubbing of SSD may be done 1.5 times less than HD to achieve the same consistency of data.

Another way to address the distinction between HD and SSD may be directed to determining data scrubbing block size. In accordance with another exemplary embodiment, it may be determined that the data scrubbing block size of a SSD is fivefold that of a HD. This differential data scrubbing block size definition may translate into less scrub cycles and hence less cost for a SSD as compared to a HD.

Similar examples could be given for various data storage configurations. For example, RAID0 and RAID1 architectures are more vulnerable for data failures than, e.g., RAID6. Thus, in accordance with an exemplary embodiment, data scrub frequency or data scrubbing block size may be altered in a different manner for a RAID0 or RAID1 configuration than for a RAID6 configuration. It is noted that within a storage cloud, more than one type of RAID configuration may be used. Cloud topology is another parameter that may be a determining factor with respect to data scrubbing for data storage units.

Figure 4:
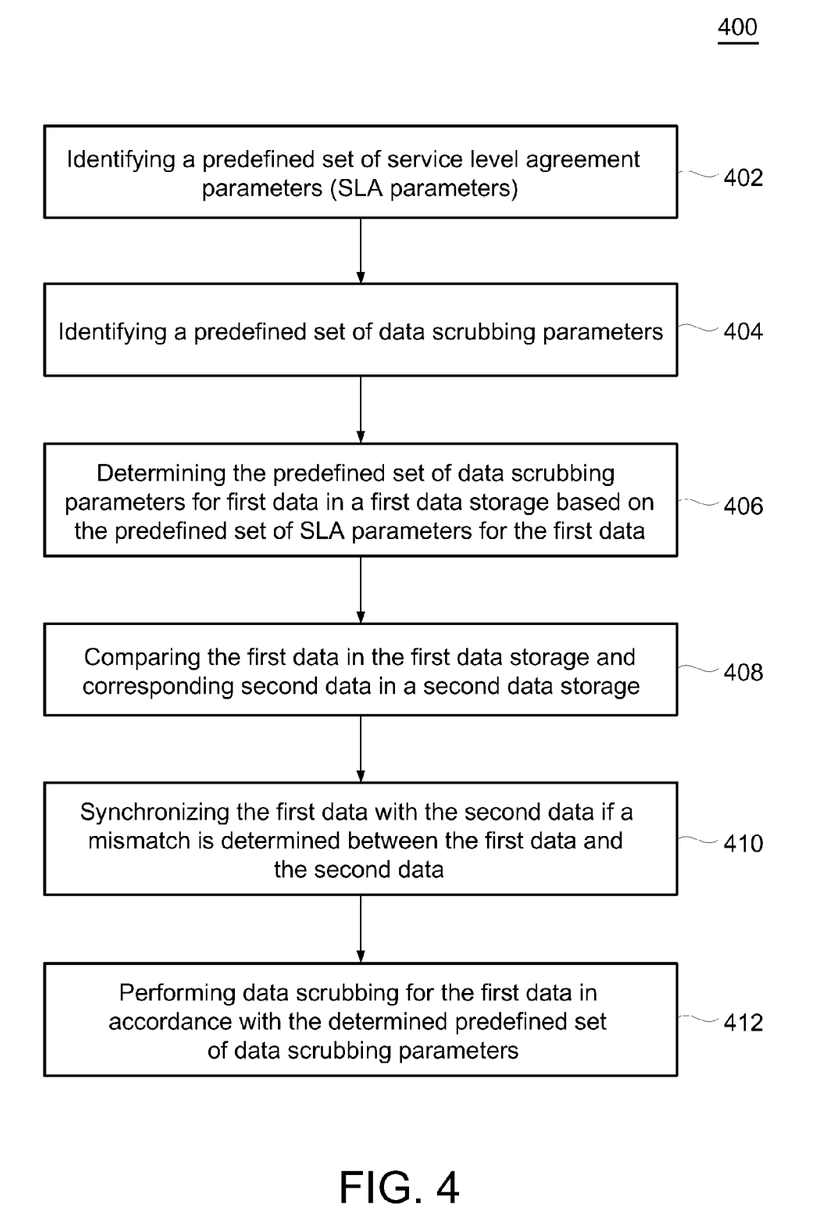
FIG. 4 shows a flow chart for data management in a cloud, in accordance with an exemplary embodiment.

FIG. 4 shows a flow chart illustrating process steps of a method 400 for data management in accordance with an exemplary embodiment. The method 400 may be implemented via a computing device. Step 402 provides for identifying a predefined set of service level agreement parameters (SLA parameters). The predefined set of SLA parameters may include at least one of data latency, allocation of central processing unit (CPU) usage, and data availability. The data availability SLA parameter may be used to determine whether a data block is associated with crucial data (i.e., data with high priority or significance) and/or whether a data block is associated with a premium customer. A data block associated with crucial data and/or a premium customer may have a SLA-designated data availability that is higher than other data blocks. Accordingly, as further described herein, a data block associated with crucial data and/or a premium customer may be given higher priority than other data blocks with respect to data scrubbing. Step 404 provides for identifying a predefined set of data scrubbing parameters. The predefined set of data scrubbing parameters may include at least one of data scrubbing frequency and data scrubbing block size.

Step 406 of the method 400 provides for determining the predefined set of data scrubbing parameters for first data in a first data storage based on the predefined set of SLA parameters for the first data. In accordance with an exemplary embodiment, data scrubbing frequency determined for the first data may be higher than data scrubbing frequency determined for other data if data availability for the first data is higher than data availability for the other data. In such case, data blocks for the first data may be scrubbed more frequently than data blocks for other data. For example, in cloud computing, it may be necessary for a tenant1 to have a higher data availability than a tenant2, and in such case the data scrubbing frequency parameter may be focused upon. More specifically, if the data availability SLA parameter for tenant1 data blocks is higher than the data availability SLA parameter for tenant2 data blocks, then the data scrubbing frequency determined for the tenant1 data blocks may be higher than the data scrubbing frequency determined for tenant2 data blocks. Thus, in such case, for data blocks holding tenant1 data, data scrubbing may be performed more frequently as compared to data blocks holding tenant2 data.

In accordance with another exemplary embodiment, data scrubbing block size determined for the first data may be smaller than data scrubbing block size determined for other data if data availability for the first data is higher than data availability for the other data. In such case, data blocks for the first data may be scrubbed at a finer granular level (and thus more thoroughly) than data blocks for other data.

Step 408 provides for comparing the first data in the first data storage and corresponding second data in a second data storage. Step 410 provides for synchronizing the first data with the second data if a mismatch is determined between the first data and the second data as a result of the comparison at step 408. Step 412 provides for performing data scrubbing for the first data in accordance with the determined predefined set of data scrubbing parameters.

Cloud computing is a form of computing over the internet where an application or software product is licensed for use as a service provided to customers on demand. Through less costly, on-demand pricing from service providers, IT spending on software purchases may be reduced. Different users availing a service typically have different service level agreements in place. In a cloud, resources are dynamically provisioned on a fine-grained, self-service basis over the Internet. Failure to consider different types of users and their SLA parameters may pose certain issues, since a task executing within a cloud can consume substantial resources, which may lead to failure in meeting more stringent SLA parameters. Such cases have become more prominent and relevant in the emerging cloud computing business models, where management of hybrid customers over a given infrastructure is a significant challenge. Disk scrubbing is one such computationally expensive task.

In accordance with an exemplary embodiment, a system segregates data blocks belonging to different users and their respective SLA parameters. The system then checks and repairs regions holding data of customers with stricter SLA parameters more frequently and more granularly as compared to regions including blocks with normal SLA parameters. The method 400 described above provides an exemplary data scrubbing method that may be implemented in such a system.

In accordance with an embodiment, the Lightweight Directory Access Protocol (LDAP) may be used to hold users/tenants of the cloud. The LDAP is an application protocol for querying and modifying data using directory services running over the Internet Protocol Suite (TCP/IP). A directory is a set of objects with attributes organized in a logical and hierarchical manner. A simple example is a telephone directory, which consists of an alphabetical list of names of persons and/or organizations, with each name having an associated address and/or phone number. The exemplary LDAP attributes hold the following information:

User Roles
Cloud Administrator: Admin
Tenant 1: Tent @type//"PREMIUM"
Tenant 2: Ten2 @type//"NON PREMIUM"

For example, on the storage side, if there are five physical hard disks, then it is possible to create a RAID module comprising the first three disks and another RAID module comprising the other two disks and to create logical units with respect to such configuration. An exemplary embodiment leverages a file system mounted over these logical units with a secure scrubbing mechanism as follows. When a node of the configuration receives a delete request, the disk integrity scrubbing rules are used to determine frequency of 'writes' to perform for each disk type in the configuration for different customers. Such 'writes' are performed during data scrubbing in order to reconstruct bad sectors of data. Although relevant rules for the configuration may be included on each server, such rules alternatively or additionally may be implemented in a persistent data store (e.g., a database), included in the relevant file system, or loaded in a singleton shared across the system. Below is an exemplary XML representation of a typical rules set for the configuration:

```
<storage @Cust_Type="Premium">
    <Integrityoverwrites="5">
</storage>
<storage @Cust_Type="Non_Premium">
    <Integrityoverwrites="3">
</storage >
```

In accordance with an exemplary embodiment, an exemplary file system (FS) may store metadata about inodes, indirect blocks and data blocks on disk that describe how the FS is laid out. The FS may have an inode for each file that may be composed of direct or indirect blocks, depending on the size of the file. Moreover, in accordance with an exemplary embodiment, the FS data block map metadata may be augmented to include the disk type being referenced for the data as follows:

| <Block ID> | <disk on which data resides and schema of the customer> |
|---|---|
| <Block 1> | HDD - "Premium" / /Ten1 |

As indicated by the content of the generic "Block ID" tag, the content of the "Block 1" tag specifies the type of storage (HDD) on which the data resides and the type of customer (Premium).

Data scrubbing may be executed by a scrubbing daemon program. When the scrubbing daemon program is executed over a file striped across different disks by a database or by a FS, the utility may execute the following integrity check operation (which typically involves checking data a number of times) for each data block:

Loading the data sanitization configuration required for each supported technology of the disk from the configuration properties defined in the <storage> XML element.
Interfacing with the FS to the customer type and technology type of the disk on which the data block resides.
Scrub the block in accordance with the configuration.

Software as a Service (SaaS) is a model of software deployment in which an application is licensed for use as a service provided to customers on demand. SaaS may be viewed as an instantiation of cloud computing. Using SaaS may reduce the up-front expense of software purchases via less costly, on-demand pricing from hosting service providers. SaaS permits a software vendor or supplier to control and limit use, prohibits copies and distribution, and facilitates the control of all derivative versions of vendor software. SaaS centralized control may permit the vendor or supplier to establish an ongoing revenue stream with multiple businesses and users without preloading software in each device in an organization. The SaaS software vendor or supplier may host the application on its own web server, download the application to the consumer device, and disable the application after use or after an on-demand contract expires.

Disk scrubbing is computationally expensive with respect to the CPU and I/O. Hence, mechanisms are useful that scrub regions containing data of premium users more frequently as compared to blocks containing data of normal users. As discussed herein, using SLA parameters, blocks holding crucial data and or the data of premium customers may be identified, and such blocks may be scrubbed proactively and more frequently as compared to other blocks.

Figure 5:
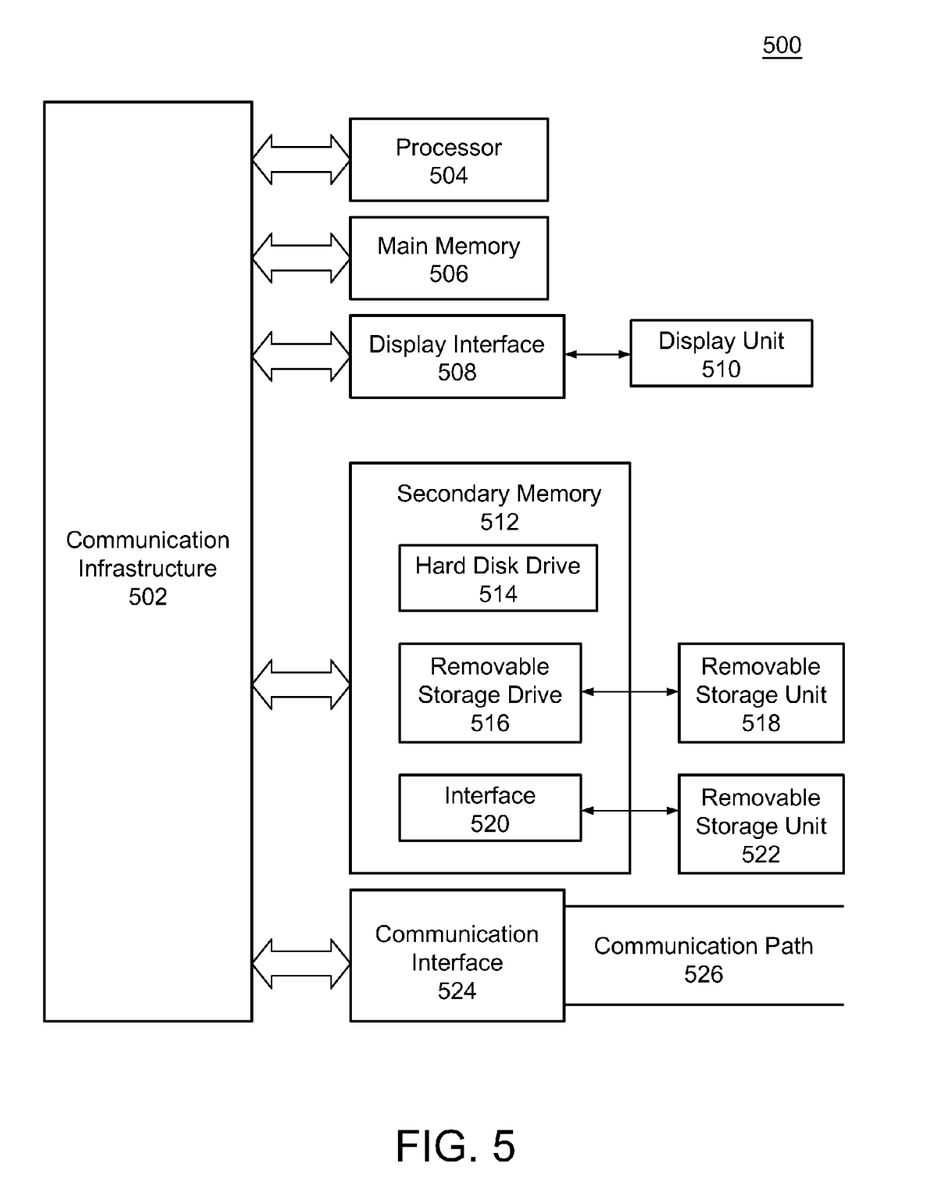
FIG. 5 shows an exemplary schematic of a computer system used for data management in accordance with an exemplary embodiment.

FIG. 5 is a block diagram of an exemplary computer system 500 that may be used for implementing the various embodiments described herein. In some embodiments, the computer system 500 may be used to perform the steps described in FIG. 3 and/or FIG. 4. The computer system 500 may include a processor 504. Although FIG. 5 illustrates a single processor, those having ordinary skill in the relevant art(s) will appreciate that more than one processor may be included as needed. The processor 504 may be connected to a communication infrastructure 502 (e.g., a communications bus, crossover bar, or network), where the communication infrastructure 502 may be configured to facilitate communication between various elements of the computer system 500. Various software embodiments are described in terms of this exemplary computer system. After reading this description, it will become apparent to those having ordinary skill in the relevant art(s) how to implement one or more of the various embodiments using other computer systems and/or computer architectures.

The computer system 500 may include a display interface 508 configured to forward graphics, text, and other data from the communication infrastructure 502 (or from a frame buffer not shown) for display on a display unit 510. The computer system 500 also may include a main memory 506, which can be random access memory (RAM), and further may include a secondary memory 512. The secondary memory 512 may include, for example, a hard disk drive 514 and/or a removable storage drive 516, which may represent a floppy disk drive, a magnetic tape drive, an optical disk drive, etc. The removable storage drive 516 may read from and/or write to a removable storage unit 518 in a manner known to those having ordinary skill in the relevant art(s). The removable storage unit 518, may represent, for example, a floppy disk, magnetic tape, optical disk, etc. The removable storage unit 518 may be read by and written to via the removable storage drive 516. As will be appreciated, the removable storage unit 518 may include a computer usable storage medium having stored therein computer software and/or data.

In accordance with one or more exemplary embodiments, the secondary memory 512 may include other similar components for allowing computer programs or other instructions to be loaded into the computer system. Such components may include, for example, a removable storage unit 522 and an interface 520. Specifically, examples of such components may include a program cartridge and cartridge interface (such as that found in video game devices), a removable memory chip (such as an EPROM, or PROM) and associated socket, and other removable storage units 522 and interfaces 520 that allow software and data to be transferred from the removable storage unit 522 to the computer system 500 and/or to the removable storage unit 522 from the computer system 500.

Furthermore, the computer system 500 may include a communications interface 524. The communications interface 524 may permit software and data to be transferred between the computer system and external devices. Examples of the communications interface 524 may include a modem, a network interface (such as an Ethernet card), a communications port, a PCMCIA slot and card, etc. Furthermore, aspects of the various embodiments described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this disclosure, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such propagated signal may take any of a variety of forms, including but not limited to electro-magnetic, optical, or any suitable combination thereof. Such propagated signal may be provided to the communications interface 524 via a communications path (i.e., channel) 526. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the various embodiments may be written in any combination of one or more programming languages, including an object oriented programming language such as Java, Smalltalk, C++ or the like, and conventional procedural programming languages, such as the C programming language or similar programming languages. The program code may execute entirely on a user's computer, partly on a user's computer, as a stand-alone software package, partly on the user's computer and partly on a remote computer or server, or entirely on the remote computer or server. In the latter scenarios, the remote computer may be connected to a user's computer via any type of network, including a local area network (LAN) or a wide area network (WAN), or a connection may be made to an external computer (e.g., via the Internet using an Internet Service Provider).

The various embodiments described herein further provide a storage medium tangibly embodying a program of machine-readable instructions executable by a digital processing apparatus to carry out a method of data management as described in the exemplary embodiments set forth above and described in detail.

Advantages of the various embodiments described herein include improved performance in data management where pluralities of data storage types and/or data storage configurations exist. Advantages of the various embodiments further include optimal allocation of resources and CPU cycles for data scrubbing for integrity of data. Advantages of the various embodiments further include optimal and potentially more efficient metadata management, optimization of data scrubbing parameters potentially resulting in reduced costs, and minimization of heat dissipation. Optimal heat dissipation also potentially yields reduced pollution and environmental damage. Advantages of the various embodiments further include optimal resource management without compromising on the SLA parameters in a cloud computing environment and also in a SaaS (Software as a Service) model of business. Although the disclosure explains various advantages of specific exemplary embodiments, those skilled in the relevant art(s) will appreciate from the teaching of the exemplary embodiments that the advantages of the various embodiments are not limited to those mentioned herein.

The described techniques may be implemented as a method, apparatus, or article of manufacture involving software, firmware, microcode, hardware, and/or any combination thereof. The term "article of manufacture" as used herein refers to code or logic and memory implemented in a medium, where such medium may include hardware logic and memory (e.g., an integrated circuit chip, Programmable Gate Array (PGA), Application Specific Integrated Circuit (ASIC), etc.) or a computer readable medium such as magnetic storage medium (e.g., hard disk drives, floppy disks, tape, etc.), optical storage (CD-ROMs, optical disks, etc.), and volatile and non-volatile memory devices (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a processor. The medium in which the code or logic is encoded also may include transmission signals propagating through space or a transmission media, such as an optical fiber, copper wire, etc. The transmission signal in which the code or logic is encoded may further include a wireless signal, satellite transmission, radio waves, infrared signals, Bluetooth, the Internet, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed. Those skilled in the relevant art(s) will recognize that many modifications may be made without departing from the scope of various embodiments, and that the article of manufacture may include any information bearing medium.

For example, the article of manufacture may include a storage medium having stored therein instructions that when executed by a machine result in operations being performed.

Certain embodiments may take the form of an entirely hardware embodiment, an entirely software embodiment, or an embodiment containing both hardware and software elements. In accordance with an embodiment, the certain embodiments may be implemented in software including but not limited to firmware, resident software, microcode, etc. Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary, a variety of optional components are described to illustrate a wide variety of possible embodiments.

Further, although process steps, method steps, or the like may be described in a sequential order, such processes, methods, and algorithms may be configured to work in alternative orders. In other words, any sequence or order of steps that may be described does not necessarily indicate that the steps be performed in that order. Rather, the steps of processes described herein may be performed in any practical order. Further, some steps may be performed simultaneously, in parallel, or concurrently. Further, some or all steps may be performed in run-time mode.

The terms "certain embodiments", "an embodiment", "embodiment", "embodiments", "the embodiment", "the embodiments", "one or more embodiments", "some embodiments", and "one embodiment" signify one or more (but not all) embodiments unless expressly specified otherwise. The terms "including", "comprising", "having" and variations thereof signify "including but not limited to", unless expressly specified otherwise. The enumerated listing of items does not imply that any or all of the items are mutually exclusive, unless expressly specified otherwise. The terms "a", "an", and "the" signify "one or more", unless expressly specified otherwise.

"Computer program" in the present context signifies any expression, in any language, code or notation, of a set of instructions intended to cause a system having an information processing capability to perform a particular function either directly or after either or both of a) conversion to another language, code or notation and b) reproduction in a different material form.

Although exemplary embodiments of the various embodiments have been described in detail, it should be understood that various changes, substitutions, and alternations could be made thereto without departing from spirit and scope of the various embodiments as defined by the appended claims. Variations described for exemplary embodiments can be realized in any combination desirable for each particular application. Thus, particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments.

What is claimed is:

1. A computing device implemented method for data management, the method comprising:
    identifying a predefined set of service level agreement (SLA) parameters, wherein the predefined set of SLA parameters comprises data availability, and wherein data availability for crucial data or data associated with a premium user is higher than data availability for non-crucial data or data associated with a non-premium user;

identifying a predefined set of data scrubbing parameters, wherein the predefined set of data scrubbing parameters comprises data scrubbing frequency;

determining the predefined set of data scrubbing parameters for first data in a first data storage based on the predefined set of SLA parameters for the first data, wherein data scrubbing frequency determined for the first data is higher than data scrubbing frequency determined for other data if data availability for the first data is higher than data availability for the other data; and performing data scrubbing for the first data in accordance with the determined predefined set of data scrubbing parameters.

2. The method of claim 1, wherein the predefined set of SLA parameters further comprises at least one of data latency and allocation of central processing unit (CPU) usage.

3. The method of claim 1, wherein the predefined set of data scrubbing parameters further comprises data scrubbing block size, and wherein data scrubbing block size determined for the first data is smaller than data scrubbing block size determined for other data if data availability for the first data is higher than data availability for the other data.

4. The method of claim 1, further comprising:
comparing the first data in the first data storage and corresponding second data in a second data storage; and
upon determining a mismatch between the first data and the second data, synchronizing the first data with the second data.

5. A data management system, the system comprising at least one processor and at least one memory, wherein the processor is configured to:
identify a predefined set of service level agreement (SLA) parameters, wherein the predefined set of SLA parameters comprises data availability, and wherein data availability for crucial data or data associated with a premium user is higher than data availability for non-crucial data or data associated with a non-premium user;
identify a predefined set of data scrubbing parameters, wherein the predefined set of data scrubbing parameters comprises data scrubbing frequency;
determine the predefined set of data scrubbing parameters for first data in a first storage based on the predefined set of SLA parameters for the first data, wherein data scrubbing frequency determined for the first data is higher than data scrubbing frequency determined for other data if data availability for the first data is higher than data availability for the other data; and
perform data scrubbing for the first data in accordance with the determined predefined set of data scrubbing parameters.

6. The system of claim 5, wherein the predefined set of SLA parameters further comprises at least one of data latency and allocation of central processing unit (CPU) usage.

7. The system of claim 5, wherein the predefined set of data scrubbing parameters further comprises data scrubbing block size, and wherein data scrubbing block size determined for the first data is smaller than data scrubbing block size determined for other data if data availability for the first data is higher than data availability for the other data.

8. The system of claim 5, wherein the processor is further configured to:
compare the first data in the first data storage and corresponding second data in a second data storage; and
upon determining a mismatch between the first data and the second data, synchronize the first data with the second data.

9. A computer program product for data management, the computer program product comprising a tangible computer readable storage medium having computer readable program code instructions stored therein comprising:
a first set of instructions for identifying a predefined set of service level agreement (SLA) parameters, wherein the predefined set of SLA parameters comprises data availability, and wherein data availability for crucial data or data associated with a premium user is higher than data availability for non-crucial data or data associated with a non-premium user;
a second set of instructions for identifying a predefined set of data scrubbing parameters, wherein the predefined set of data scrubbing parameters comprises data scrubbing frequency;
a third set of instructions for determining the predefined set of data scrubbing parameters for first data in a first storage based on the predefined set of SLA parameters for the first data, wherein data scrubbing frequency determined for the first data is higher than data scrubbing frequency determined for other data if data availability for the first data is higher than data availability for the other data; and
a fourth set of instructions for performing data scrubbing for the first data in accordance with the determined predefined set of data scrubbing parameters.

10. The computer program product of claim 9, wherein the predefined set of SLA parameters further comprises at least one of data latency and allocation of central processing unit (CPU) usage.

11. The computer program product of claim 9, wherein the predefined set of data scrubbing parameters further comprises data scrubbing block size, and wherein data scrubbing block size determined for the first data is smaller than data scrubbing block size determined for other data if data availability for the first data is higher than data availability for the other data.

12. The computer program product of claim 9, wherein the computer-readable program code instructions further comprise:
a fifth set of instructions for comparing the first data in the first data storage and corresponding second data in a second data storage; and
a sixth set of instructions for, upon determining a mismatch between the first data and the second data, synchronizing the first data with the second data.

* * * * *